United States Patent Office 2,739,054
Patented Mar. 20, 1956

2,739,054
METHOD OF PRODUCING PHOSPHATED FERTILIZERS

Louis E. Andres, St. Gratien, and Jean L. Iragne, Villeneuve La Garenne, France, assignors to Potasse & Engrais Chimiques, Paris, France, a societe anonyme of France No Drawing. Application January 18, 1952, Serial No. 267,212

Claims priority, application France February 2, 1951

8 Claims. (Cl. 71—39)

This invention relates to phosphated fertilizers and their manufacture.

It is generally admitted that phosphoric acid contained in a fertilizer is the more easily assimilated by plants the more soluble it is in ammonium citrate. Thus the market value of a phosphated fertilizer and its agronomical efficiency is closely related to its solubility in ammonium citrate.

The production of a phosphated fertilizer usually involves rendering soluble the phosphoric acid contained in the natural phosphate by means of a mineral acid, which may be sulphuric acid, hydrochloric acid, nitric acid or phosphoric acid. It is, however, necessary to avoid too much acidity in the finished fertilizer. Acid fertilizers are in fact difficult to handle, to store and to transport. They exert a corrosive action, especially on bags. A strong acidity also presents the disadvantage of decomposing other fertilizer ingredients which may be mixed with acid phosphatic fertilizer, e. g., nitrate fertilizers. Acidity partly destroys nitrate fertilizer, causing nitrogen losses.

This is the primary reason why neutralization is often applied to products obtained by attack of a natural phosphate with one of the above-mentioned acids. However, neutralization of phosphoric fertilizers presents another disadvantage in that one part of the phosphoric acid rendered soluble by the reaction between the natural phosphate and the attacking acid again becomes insoluble in ammonium citrate thus to that extent lowering at the same time its agronomical efficiency and market value as stated above.

It is also noted that the ammonium citrate solubility of the phosphoric acid of the fertilizer has a tendency to decrease in the course of the drying operation and that it decreases all the more as the drying operation is carried out at higher temperature. Moreover, even when neutralization has not been complete and drying has been effected at low temperatures, it may happen that the solubility of the phosphoric acid in ammonium citrate diminishes during the time the finished fertilizer remains in storage.

In prior commercial practice, after attack on natural phosphates by one of those of the above-mentioned mineral acids, one can hardly neutralize the product thereof beyond a pH of 4.5 without a noticeable and significant decrease in the solubility of the phosphoric acid in ammonium citrate. Furthermore, the temperature of the product should not go beyond 70° C. during drying. These two conditions have technical disadvantages and despite extreme precaution in maintaining these conditions it is not always sufficient to maintain and preserve the solubility of the phosphoric acid in ammonium citrate for an indefinite period, even if it should be perfect at the amount of manufacture.

The present invention provides a method of manufacturing phosphoric fertilizers in such a way as to avoid any reduction of solubility of the phosphoric acid in ammonium citrate. This method comprises essentially the addition during the course of the manufacture of the phosphoric fertilizer, of a magnesium compound in such a proportion that the weight of the magnesium finally present in the fertilizer is in a proportion of at least 0.1% to 2% with respect to the final weight of the fertilizer, and preferably within those limits.

The addition of the magnesium compound may be made at any stage of manufacture of phosphoric fertilizer. However, the fact, ascertained by experiment that the final fertilizer should contain 0.1% to 2% of magnesium, leads to the choice of the time for adding the magnesium at different stages of the manufacture, depending upon the process and the type of fertilizer in question. For example, in the case of dicalcium phosphate which is to be made by attack of a mineral acid on natural phosphate, and neutralization of the attack liquor after separation from the insoluble impurities, by means of lime or carbonate of lime, the magnesium compound is preferably added after the dicalcium phosphate has been precipitated and filtered. In this way no loss of the magnesium in the mother liquor will occur.

On the other hand, in the case of manufacture of a phosphoric fertilizer by the action of a mineral acid on a natural phosphate, with neutralization of the product of this attack afterwards, without separation of the liquid and the solid phase, addition of the magnesium compound can be advantageously made as soon as the attack is complete. In this case there is actually no risk of loss of magnesium as everything remains in the finished product.

It has been found, as a general rule, that it is most advantageous to add the magnesium compound before part of the phosphoric acid has become insoluble in ammonium citrate. This does not mean, however, that the addition of magnesium compounds becomes useless if a part of the phosphoric acid has already been rendered insoluble in ammonium citrate, but to re-establish complete solubility it is necessary to add a higher proportion of magnesium compound, and this entails an additional expense which may be avoided by a judicious choice of the time for the addition of the magnesium compound.

Any of the compounds of magnesium capable of producing magnesium ions may be used in the process as the source of magnesium, such, for example, as the oxide, sulphate, chloride, nitrate or phosphate of magnesium. Even a natural compound like dolomite (double carbonate of calcium and magnesium) or a natural silicate containing magnesium may be used as a source of magnesium.

The preferable magnesium compound to be used will be determined in practice by taking into account, on one hand, the cost of the material and, on the other, certain technical contingencies. The use of magnesium chloride should, for example, be avoided if the manufacture of the fertilizer involves the use of nitric acid for chlorine ions in a strongly nitric acid environment have a highly corrosive action on all metals. For a similar reason the use of magnesium nitrate should be avoided if the acid used for attack is hydrochloric acid.

The addition of the magnesium compound in accordance with the present invention permits of the complete neutralization of the fertilizer without risk of reducing the solubility of the phosphoric acid in ammonium citrate. It is not necessary when applying the process of this invention to stop neutralization at a pH in the region of 4.5. Similarly, the process of the present invention permits of drying the finished fertilizer at any temperature. The drying step may therefore be carried out at a temperature of about 100° C., whereas in prior practice it was considered undesirable to carry out the drying process above about 70° C. Moreover, fertilizers prepared in accordance with the present invention, whose phosphoric acid is completely soluble in ammonium citrate at the time of manufacture, remains stable in spite of the passage of time, and their solubility in ammonium citrate is preserved for many months without any material variation.

The process of this invention is applicable to the manufacture of all types of phosphoric fertilizer, and particularly to the manufacture of precipitated dicalcium phosphate; of ordinary ammoniated superphosphate; and of triple ammoniated superphosphates. The present invention is also applicable to the manufacture of complex fertilizers which are made according to methods now in use in industry. Application of the present invention also permits of the industrial realization of a process of complex fertilizer manufacture, whose principle itself is known, but which has not heretofore been realized in practice for reasons set out below.

According to this hitherto suggested process, a natural phosphate is attacked by nitric acid and the product of the reaction is neutralized by ammonia and all the calcium nitrate remaining in the mass is converted to calcium carbonate, by addition of ammonium carbonate or ammonium bicarbonate, or else by the simultaneous addition of carbonic gas and ammonia in suitable proportion.

In practical application, the process just mentioned presents a real difficulty, since carbonic gas cannot be fixed in the mass in a durable or permanent way unless the pH of the mass is at least 7, and it is well known that carbonate of lime is easily decomposed in an acid environment. Until the present invention, so far as we are aware, a means of manufacturing phosphated fertilizers that were perfectly neutral (pH 7) without causing part of the phosphoric acid to become insoluble in ammonium citrate, was unknown. According to the present invention, a natural phosphate is attacked by nitric acid, and a compound of magnesium is added in such a quantity that the finished fertilizer contains at least 20 molecules of magnesium for 100 molecules of $P_2O_5$, then the mass is neutralized by ammonia until a pH at least equal to 7 is obtained, then ammonium carbonate, or ammonia and carbonic acid separately, are added, or else some compound of carbonic acid and ammonia. When magnesium is added in the process of manufacturing the fertilizer as stated, a definite improvement in solubility of the phosphoric acid in ammonium citrate is obtained when compared with fertilizer manufactured according to old processes which did not involve the addition of a magnesium compound.

Although distinctly improved, in some instances when only magnesium is added, the solubility of the phosphoric acid in ammonium citrate may not always be complete. Research having been conducted into the reasons for this phenomenon, it has been found that to attain total efficacy of the addition of magnesium in such a case, the mass should also contain a certain proportion of sulphate ions. It frequently happens, however, that the quantity of sulphate ions is already in the mass, but this is not always the case. Accordingly, if sufficient sulphate ions are not already present in the mass, then sufficient sulphate ions should be added as well as the magnesium ions.

The quantity of sulphate ions necessary to obtain total solubility of phosphoric acid in ammonium citrate after introduction of the magnesium compound, is 20 molecules $SO_4$ to 100 molecules $P_2O_5$. There is therefore a stoichiometric equivalent between the quantities of magnesium ions and sulphate ions necessary. If the mass already contains a proportion equal to or above 20 molecules of sulphate ions to 100 molecules of $P_2O_5$ there is no need to add any. If on the contrary, the proportion of sulphate ions is below 20 molecules of sulphate ions to 100 molecules of $P_2O_5$ this proportion must be established by the addition of sulphate ions.

When the magnesium compound added is magnesium sulphate, the introduction of magnesium ions and sulphate ions is simultaneous and the best relationship is obtained. But it is not necessary to introduce magnesium in the form of a sulphate. Often in practice it will be found more advantageous to introduce magnesium in the form of a natural compound as those listed above, and sulphate ions in the form of a sulphate which may be natural such as sulphate of lime. The sulphate ions should preferably be introduced at the same time and at the same stage of manufacture as magnesium ions.

It is significant that the quantity of magnesium ions introduced into phosphoric fertilizers, according to the present invention, is really very small. Actually the proportion of 20 magnesium molecules for 100 $P_2O_5$ molecules represents in weight a proportion of 3.4 kgs. of magnesium to 100 kgs. of $P_2O_5$; the atomic weight of magnesium being 24 and the molecular weight of $P_2O_5$ being 142. If then the final fertilizer contains 10% of $P_2O_5$ which is a usual proportion for a complex fertilizer, the proportion of magnesium in this fertilizer is only 0.34%; that is, 3.4 kgs. per 1000 kgs. of finished fertilizer. Similarly, the amount of sulphate ions is very small, although somewhat higher in weight than that of the magnesium ions, since the molecular weight of $SO_4$ is 96. In other words, 0.34% of magnesium corresponds to 1.36% of $SO_4$; or 13.6 kgs. $SO_4$ per 1000 kgs. of finished fertilizer.

It should be noted that such a proportion of sulphate ions is far from enough to convert into calcium sulphate all the calcium nitrate remaining in the mass after neutralization of the reaction product of the attacking acid and natural phosphate. This is important as the later addition of carbonic gas after the neutralization has as its purpose the conversion into calcium carbonate of the calcium nitrate remaining in the mass after neutralization by ammonia, so that the calcium nitrate (which is hygroscopic) is converted to calcium carbonate which remains fixed. According to a hitherto suggested process for the manufacture of complex fertilizers, the calcium nitrate is blocked by the addition of sulphate ions, but in that case the proportion of sulphate ions necessary is at least five times that required by the process of this invention. Sulphate ions added in small quantities at the same time as the magnesium ions do not react in converting the calcium nitrate into calcium sulphate, since the efficacy of the sulphate ions, according to the process of this invention, is just as great if they are introduced in the form of calcium sulphate.

In the practical carrying out of the process of the invention on a commercial scale, it is preferable to use commercial nitric acid (containing of the order of 50% $HNO_3$) for attacking natural phosphate. The quantity of nitric acid used depends upon the composition of the natural phosphate. It should be at least equal to that necessary to render all the phosphoric acid soluble in water. Excess of acid is determined by the type of fertilizer required. To the reaction product of the natural phosphate and attacking acid should be added a compound of magnesium capable of supplying the required magnesium ions.

The quantity of magnesium to be incorporated in the mass resulting from the attack should be, as stated in the foregoing, enough so that there is present in the mass at least 20 molecules of magnesium to 100 molecules of $P_2O_5$ because a smaller addition would lead to incomplete solubility of the phosphoric acid in ammonium citrate. A larger addition would not be harmful, but it would not produce any material advantage. As for the sulphuric ions, they may be introduced in the form of sulphuric acid or a sulphate, such as an alkaline or alkaline-earth sulphate, and the quantity added should be enough so that there is present in the mass at least an amount of sulphate molecules equivalent to the 20 molecules of magnesium per 100 molecules of $P_2O_5$.

The ammonia, which is added to the reaction product of the natural rock phosphate and nitric acid after the addition of the magnesium and sulphuric ions, is preferably added to the mass in the gaseous state and the mass should be well agitated while introducing the gas in order to insure intimate contact and intermixing in carrying out the neutralization reaction. The addition of the ammonia has the effect of neutralizing the mass or paste and of converting into dicalcium phosphate, the phosphoric acid which entered into solution at the time of the acid reaction. Ammonium nitrate is formed at the same time, using up a part of the calcium nitrate present. The addition of ammonia should be continued until a definitely alkaline reaction in the mass is obtained and it may be and preferably is, continued until the mass reaches a pH in the neighborhood of 10.

After this definite state of alkalinity is obtained by the introduction of ammonia, then carbonic gas may be injected, at atmospheric or higher pressure, into the mass to combine with excess ammonia in such away as to produce ammonium carbonate, which converts the calcium nitrate present into calcium carbonate and ammonium nitrate. The calcium nitrate, which is a very water-absorbent substance, is thus eliminated and all of the nitrogen is now in the form of ammonium nitrate. After sufficient $CO_2$ has been introduced to effect completion of the above-mentioned reactions, the mass or paste is substantially neutral and it may now be dried and granulated.

If it is desired to produce a ternary fertilizer containing nitrogen, phosphorous and potassium (usually referred to and calculated at N; $P_2O_5$; $K_2O$), potassium salt such as potassium chloride (KCl) or other suitable potassium salt may be added to and mixed with the paste after the above mentioned reactions have been carried out, after which the mass may be dried and granulated.

Although the novel features which are believed to be characteristic of the invention will be pointed out in the annexed claims, the invention itself as to its objects and advantages and the manner in which it may be carried out may be better understood by reference to the following examples taken in connection with the foregoing description.

Example I

One thousand (1000) kilogrammes of natural Moroccan calcium phosphate (assaying 33% $P_2O_5$) was treated with 1,464 kilogrammes of 50% nitric acid while agitating the mixture to insure intimate mixing and reaction. The resulting mass or paste was reacted with 80 kilogrammes of ammonia by injecting the ammonia in gaseous form into the mass while agitating it, to transfer all the $P_2O_5$ into dicalcium phosphate. The mass was then placed in a gas-tight tank and 550 kilogrammes of crystallized ammonium bicarbonate was added; thus transforming all the calcium nitrates into ammonium nitrate and calcium carbonate. The resulting paste was mixed with the dry product of a previous operation and 120 kilogrammes of hydrated magnesium sulphate was added. Granulation was next carried out, and the granules obtained were dried in a rotary drier and the siftings sent back for regranulating.

This produced 2300 kilogrammes of fertilizer, containing:

14% $P_2O_5$ soluble in ammonium citrate
7% ammoniated nitrogen
7% nitrogen derived from nitric acid

Example II

Two thousand, five hundred (2500) kilogrammes of Moroccan calcium phosphate, of the Louis Gentil type, assaying 32% $P_2O_5$, were reacted with 3,230 liters of nitric acid (54% of $HNO_3$). To the mass resulting from this reaction were added 260 kilogrammes of magnesium nitrate [$Mg(NO_3)_2.6H_2O$] and 188 kilogrammes of dihydrated calcium sulphate. Then 650 kilogrammes of ammonia ($NH_3$) in gaseous form was injected into the mass. The mixture was cooled to below 60° C. and then 450 kilogrammes of carbonic acid gas ($CO_2$) were introduced. After drying of the resultant paste, 6000 kilogrammes of fertilizer were obtained, analyzing as follows:

|  | Per cent |
|---|---|
| Nitrogen in the form of nitrates | 8.35 |
| Ammoniated nitrogen | 8.3 |
| Total phosphoric acid | 13.2 |
| Phosphoric acid soluble in ammonium citrate | 13.1 |
| Carbonic acid | 7.5 |

Example III

As in Example II, 2,500 kilogrammes of Moroccan calcium phosphate of the Louis Gentil type, assaying 32% $P_2O_5$, were reacted with 3,230 liters of nitric acid (54% $HNO_3$). To the resultant paste there were added 270 kilogrammes of magnesium sulphate ($MgSO_4.7H_2O$). Then 650 kilogrammes of ammonia ($NH_3$) in gaseous form were injected into the paste. After cooling as in Example II, 450 kilogrammes of carbonic acid gas ($CO_2$) were injected into the resulting paste. After this reaction, the paste was dried and 5,860 kilogrammes of fertilizer were obtained, analyzing as follows:

|  | Per cent |
|---|---|
| Nitrogen in the form of nitrates | 8.7 |
| Ammoniated nitrogen | 8.6 |
| Total phosphoric acid | 13.5 |
| Phosphoric acid soluble in ammonium citrate | 13.0 |
| Carbonic acid | 7.5 |

The fertilizers produced by the procedures above described are substantially neutral and therefore may be safely packaged, stored, or transported in the bags customarily used for fertilizer. Moreover, it has been found that the addition of Mg ions as above described to the reaction products during the course of the manufacture of the fertilizer prior to the drying operation, permits the drying operation to be carried out without the necessity of undue precautions against forming or reconverting the desired ammonium-citrate-soluble phosphate into an undesired form in which it is insoluble in ammonium citrate. Furthermore, the drying operation can be carried out at a temperature higher than that heretofore in use without danger of reconverting any ammonium-citrate-soluble phosphoric acid into a form in which it is insoluble in ammonium citrate. Drying at 100° C. now presents no disadvantages.

In addition, fertilizers made according to the process of the invention as above described will, notwithstanding the passage of time, maintain a constant content of phosphoric acid soluble in ammonium citrate whereas fertilizers heretofore have suffered a change in the phosphoric acid content in that there was a tendency of the ammonium-citrate-soluble phosphoric acid which was originally present when the fertilizer was fresh, to change to a form in which it is insoluble in ammonium citrate. Also, the process provided by the invention permits of complete neutralization without resulting decrease in ammonium citrate solubility. Whereas, heretofore, attempts to completely neutralize in industrial processes as heretofore practised led to insufficient solubility of the phosphoric acid in ammonium citrate, this invention provides an industrially applicable process in which not only maximum solubility of the phosphoric acid in ammonium citrate can be obtained and retained, but at the same time complete neutralization can be accomplished.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. A process for the manufacture of a complex fertilizer which has a pH not substantially lower than pH 7 and substantially free of tricalcium phosphate and containing nitrogen in the form of nitrates and nitrogen in ammoniated form and phosphoric acid in the form of phosphates soluble in ammonium citrate, which comprises treating a natural phosphate rock containing substantial amounts of tricalcium phosphate with nitric acid followed by the step of neutralization of the mass without any removal of salts of calcium from the mass and prior to said neutralization step adding to the reaction product of said natural phosphate and acid sufficient quantities of magnesium and of sulphate ions to insure that at least 20 molecules of Mg and 20 molecules of $SO_4$ to 100 molecules of $P_2O_5$ are present in the mass, said magnesium ions acting to prevent formation of phosphate in a form which is insoluble in ammonium citrate thereby producing a neutral fertilizer free from phosphate in a form which is insoluble in ammonium citrate.

2. A process of manufacturing a complex fertilizer which is free from tricalcium phosphate and having a pH not substantially less than pH 7 and containing nitrogen in the form of nitrates and nitrogen in ammoniated form and phosphoric acid in the form of phosphates soluble in ammonium citrate, which comprises reacting natural phosphate containing a substantial amount of phosphate in tricalcium form with nitric acid in sufficient amount to render water soluble the phosphate initially contained in said natural phosphate, adding to the mass resulting from said reaction without removal of any salts of calcium from the mass sufficient quantities of magnesium molecules and sulphate molecules to insure that at least 20 molecules of Mg and 20 molecules of $SO_4$ to 100 molecules of $P_2O_5$ are present in the mass, and introducing ammonia in the mass in an amount sufficient to neutralize the mass at least to pH 7, said Mg acting in said mass to prevent reversion of phosphate therein to tricalcium form thereby producing a complex fertilizer free from tricalcium phosphate.

3. A process for the manufacture of a complex phosphate fertilizer substantially free from tricalcium phosphate and having a pH not substantially less than pH 7 containing nitrogen in the form of nitrates and nitrogen in ammoniated form and all of its phosphoric acid in the form of phosphates soluble in ammonium citrate, which comprises reacting natural phosphate rock with nitric acid sufficient to render the tricalcium phosphate initially present in said rock water-soluble, adding to the mass resulting from said reaction equivalent quantities of magnesium ions and of sulphate ions in the proportion of at least 20 molecules of Mg and 20 molecules of $SO_4$ to 100 molecules of $P_2O_5$ present in the mass, and introducing ammonia into the mass in an amount equivalent to the nitric acid introduced, thereby producing a complex fertilizer in which all the phosphate is present in a form which is soluble in ammonium citrate.

4. A process for the manufacture of a complex fertilizer containing nitrogen in the form of nitrates and nitrogen in ammoniated form and phosphoric acid in phosphate form soluble in ammonium citrate which comprises treating natural phosphate in which phosphate is present in a form insoluble in ammonium citrate with sufficient nitric acid to render the phosphate water-soluble, adding to the mass resulting from said reaction equivalent quantities of magnesium ions and sulphate ions in the proportion of at least 20 molecules of Mg to 100 molecules of $P_2O_5$ present in the mass, introducing ammonia into said mass in an amount equivalent to the nitric acid introduced and then introducing carbonic acid gas into the reaction mixture in sufficient amount to neutralize all excess ammonia present, thereby to produce a complex fertilizer in which all the phosphate is present in a form which is soluble in ammonium citrate.

5. A process of manufacturing a complex fertilizer containing nitrogen in the form of nitrates and nitrogen in ammoniated form and phosphoric acid in phosphate form soluble in ammonium citrate which comprises reacting natural calcium phosphate rock containing tricalcium phosphate which is insoluble in water with sufficient nitric acid to render the phosphate water-soluble, adding to the mass resulting from said reaction sufficient quantities of magnesium and sulphate molecules to insure that at least 20 molecules of Mg and 20 molecules of $SO_4$ to 100 molecules of $P_2O_5$ are present in the mass, introducing ammonia into said mass in an amount at least equivalent to the nitric acid introduced and sufficient to produce a reaction mixture having a pH higher than pH 7 and then introducing carbonic acid gas into the reaction mixture in sufficient amount to react with excess ammonia present and sufficient to lower the pH of said mixture to about pH 7, said carbonic acid acting to produce ammonium carbonate effective to react with any calcium nitrate present to convert it into calcium carbonate and ammonium nitrate and said magnesium acting in said mass to prevent reversion of phosphate present therein to a form which is insoluble in ammonium citrate.

6. A process for the manufacture of a complex fertilizer containing nitrogen in the form of nitrates and nitrogen in ammoniated form and phosphoric acid in the form of phosphate soluble in ammonium citrate which comprises treating natural rock phosphate containing phosphate in a form which is insoluble in ammonium citrate and insoluble in water with sufficient nitric acid to render the phosphate water-soluble and thereby producing a mass which is acidic, adding to the mass resulting from said reaction equivalent quantities of magnesium ions and sulphate ions in the proportion of at least 20 molecules of Mg to 100 molecules of $P_2O_5$ present in the mass, introducing ammonia into said mass in an amount at least equivalent to the nitric acid introduced and sufficient to produce a mass having a pH higher than pH 8 and then introducing carbonic acid gas into the reaction mixture in sufficient amount to react with excess ammonia present and sufficient to lower the pH to pH 7, thereby to produce ammonium carbonate in said mixture effective to react with any calcium nitrate present to convert it into calcium carbonate and ammonium nitrate, said Mg acting to prevent reversion of phosphate in said mass to a form which is insoluble in ammonium citrate.

7. A process for the manufacture of a complex fertilizer containing nitrogen in the form of nitrates and nitrogen in ammoniated form and phosphoric acid in the form of phosphate soluble in ammonium citrate which comprises treating natural calcium phosphate containing phosphate in tricalcium form with sufficient nitric acid to render the phosphate water-soluble, adding to the mass resulting from said reaction equivalent quantities of magnesium ions and sulphate ions in the proportion of at least 20 molecules of Mg to 100 molecules of $P_2O_5$ present in the mass, introducing ammonia into said mass at least in an amount equivalent to the nitric acid introduced and sufficient to raise the alkalinity of the mass to a pH of the order of 8 to 10, and then introducing carbonic acid gas into the reaction mixture in sufficient amount to react with excess ammonia present, thereby to convert any calcium nitrate present into calcium carbonate and ammonium nitrate and thereafter drying the mass.

8. A process for the manufacture of a complex fertilizer containing nitrogen in the form of nitrates and nitrogen in ammoniated form and phosphoric acid in the form of phosphate soluble in ammonium citrate which comprises treating natural calcium phosphate containing phosphate in tricalcium form with sufficient nitric acid to render the phosphate water-soluble and thereby forming an acidic reaction mass, adding to the mass resulting from said reaction equivalent quantities of magnesium ions and sulphate ions in the proportion of at least 20 molecules of Mg to 100 molecules of $P_2O_5$ present in the mass, introducing ammonia into said mass in an amount at least equivalent to the nitric acid introduced and sufficient to raise the pH to substantially higher than pH 7 and then introducing carbonic acid gas into the reaction mixture in an amount sufficient to reduce the pH to about pH 7, thereby causing calcium nitrate present to be converted into calcium carbonate and ammonium nitrate and producing a substantially neutral reaction mass, adding to the mass a potassium containing salt and thereafter drying the mass.

References Cited in the file of this patent

UNITED STATES PATENTS

| | | |
|---|---|---|
| 252,029 | Gibbons et al. | Jan. 10, 1882 |
| 305,249 | Stillman | Sept. 16, 1884 |
| 1,252,318 | Blumenberg | Jan. 1, 1918 |
| 1,788,828 | Goldberg et al. | Jan. 13, 1931 |
| 1,854,291 | Burdick | Apr. 19, 1932 |
| 1,953,419 | Mac Intire | Apr. 3, 1934 |
| 2,223,316 | Ellis et al. | Nov. 26, 1940 |
| 2,280,451 | Riddle | Apr. 21, 1942 |

FOREIGN PATENTS

| | | |
|---|---|---|
| 2,568 | Great Britain | July 22, 1874 |
| 283,558 | Great Britain | July 26, 1928 |
| 376,934 | Great Britain | July 21, 1932 |